United States Patent [19]
Goto et al.

[11] Patent Number: 5,119,795
[45] Date of Patent: Jun. 9, 1992

[54] INTAKE SYSTEM WITH MECHANICAL SUPERCHARGER FOR INTERNAL COMBUSTION ENGINE

[75] Inventors: Tsuyoshi Goto; Kouichi Hatamura; Yoshihiro Nakagawa, all of Hiroshima, Japan

[73] Assignee: Mazda Motor Corporation, Hiroshima, Japan

[21] Appl. No.: 647,019

[22] Filed: Jan. 30, 1991

[51] Int. Cl.[5] .................... F02B 29/04; F02B 33/00
[52] U.S. Cl. ................................. 123/563; 123/564
[58] Field of Search .................. 60/599; 123/563, 564

[56] References Cited

U.S. PATENT DOCUMENTS

| | | | |
|---|---|---|---|
| 3,712,282 | 1/1973 | Isley | 123/563 |
| 4,513,729 | 4/1985 | Udd | 123/563 |
| 5,022,375 | 6/1991 | Goto et al. | 123/564 |

FOREIGN PATENT DOCUMENTS

| | | | |
|---|---|---|---|
| 3104124 | 9/1982 | Fed. Rep. of Germany | 123/563 |
| 168218 | 9/1984 | Japan | 123/564 |
| 17138 | 1/1986 | Japan | 123/564 |
| 177410 | 7/1989 | Japan | 123/564 |
| 1255956 | 12/1971 | United Kingdom | 123/563 |

Primary Examiner—Michael Koczo, Jr.
Attorney, Agent, or Firm—Fleit, Jacobson, Cohn, Price, Holman & Stern

[57] ABSTRACT

An intake system comprises an intake passage provided, in order from an upstream side of the intake passage, with a throttle valve, a mechanical compressor supercharger and an inter-cooler for delivering supercharged air discharged by the supercharger into cylinders of an internal combustion engine. The intake passage has a supercharger bypass passage for allowing an intake air flow to bypass the supercharger, and an inter-cooler bypass passage for allowing a supercharged air flow to bypass the inter-cooler. Pneumatic valves, disposed, respectively, in the supercharger and inter-cooler bypasses passages, are controlled to open both the bypass passages when the internal combustion engine operates in a range of lower loads, to open at least the supercharger bypass passage when the internal combustion engine operates in a range of medium loads, and to close both the bypass passages when the internal combustion engine operates in a range of higher loads.

10 Claims, 9 Drawing Sheets

INTAKE SYSTEM WITH MECHANICAL SUPERCHARGER FOR INTERNAL COMBUSTION ENGINE

The present invention relates to an intake system for an engine and, more particularly, to an intake system with a mechanical supercharger for an internal combustion engine.

BACKGROUND OF THE INVENTION

1. Field of the Invention

An internal combustion engine has been developed with improved charging efficiency obtained by a supercharger, such as a mechanical supercharger, driven from the engine crankshaft through belts, gears or chains, and a turbocharger, driven by exhaust gases of the engine. There are two types of mechanical superchargers. These types are a compressor type of supercharger which compresses intake air and a volume or blower type of supercharger, which does not itself compress intake air.

A compressor type supercharger (which is referred to simply as a "compressor supercharger") provides a high supercharge pressure when the engine operates at higher, or heavier loads. In this manner, the supercharger improves charging efficiency or raises engine power as compared to a volume type supercharger. Further, the compressor supercharger, when the engine operates at lower, or lighter, loads and moderate loads, raises the temperature of intake air, so as to cause a decrease in pumping loss of the engine and to improve fuel vaporization or fuel atomization. This results in an improvement in fuel economy and a decrease in the hydrocarbon (HC) content of emission gases.

On the other hand, the compressor supercharger has the disadvantage of requiring a higher driving power higher than a volume type supercharger, since it is necessary to compress intake air. Due to this fact, the compressor supercharger increases driving loss while the engine operates at lower, or lighter, loads, and provides less engine power.

2. Description of Related Art

To reduce the driving loss of the volume type supercharger, it is typical, as is known from, for instance, Japanese Unexamined Utility Model Publication No. 63-51121, to provide an intake system having a bypass passage with a control valve bypassing the supercharger. The control valve is actuated to open the bypass passage at lower, or lighter, engine loads so as to decrease driving loss of the supercharger.

The fuel economy and emission gas properties of the engine can be improved, in particular, at lower engine loads by using a compressor supercharger, which provides the advantage of raising the temperature of intake air. However, during the operation of the engine at higher, or heavier, engine loads, wherein the intake air is compressed to a high pressure, the temperature of the compressed intake air is raised to excess, so as to often cause undesirable or abnormal fuel combustion. For this reason, it is essential to install an inter-cooler in the intake passage downstream of the compressor supercharger and to control the cooling temperature of intake air according to operating engine loads.

Compared with the intake system with a volume type supercharger, in which, when the engine operates at lower, or lighter, loads, intake air flows so as to bypass the supercharger loads and effectively decrease the driving loss of the supercharger, a system having a compressor supercharger tends to waste driving power. This is because of the fact that a compressor supercharger, such as, in particular, a compressor supercharger always driven by the engine, works to compress intake air even at lower engine loads, where the engine has no supercharging demand. Thus, the compressor supercharger uselessly wastes driving power.

SUMMARY OF THE INVENTION

A primary object of the present invention is to provide an intake system with a compressor type of mechanical supercharger by which an internal combustion engine is improved, so as to provide a high power, improve fuel economy in a low engine load range, and decreased driving power loss.

This object is achieved by providing an intake system that comprises an intake passage provided, in order from an upstream side thereof, with a throttle valve, a mechanical compressor supercharger and an inter-cooler for delivering supercharged air into cylinders of a internal combustion engine. The intake system is provided with a supercharger bypass passage that branches off from the intake passage upstream of the supercharger and is connected to the intake passage downstream of the supercharger so as to allow an intake air flow to bypass the supercharger. The intake system is further provided with an inter-cooler bypass passage that branches off from the intake passage upstream of the inter-cooler and is connected to the intake passage downstream of the inter-cooler so as to allow a supercharged air flow to bypass the inter-cooler. Pneumatic valve means is caused by control means to open both the supercharger and inter-cooler bypass passages when the internal combustion engine operates in a range of lower loads, to open at least the supercharger bypass passage when the internal combustion engine operates in a range of medium loads, and to close both the supercharger and inter-cooler bypass passages when the internal combustion engine operates in a range of higher loads.

In a specific embodiment, the supercharger bypass passage, branching off from the intake passage upstream of the supercharger and connected to the intake passage downstream of the supercharger, is provided with first pneumatic valve means disposed in the supercharger bypass passage so as to open and close the supercharger bypass passage according to engine operating conditions. The inter-cooler bypass passage, branching off from the supercharger bypass passage between the supercharger and the first valve and connected to the intake passage downstream of the intercooler, is provided with second pneumatic valve means disposed in the supercharger bypass passage downstream of the first valve means so as to open and close the inter-cooler bypass passage according to engine operating conditions. The first and second pneumatic valve means are specifically controlled to open both the supercharger bypass passage and inter-cooler bypass passage when the internal combustion engine operates in the range of lower loads, to open the supercharger bypass passage and close the inter-cooler bypass passage when the internal combustion engine operates in the range of medium loads, and to close both the supercharger bypass passage and the inter-cooler bypass passage when the internal combustion engine operates in the range of higher loads.

When the supercharger bypass passage is opened, part of supercharged air discharged from the supercharger, which is not drawn in the cylinders, returns into the intake passage upstream of the supercharger, so that the pressure difference created between the opposite sides of the supercharger becomes small. The remaining part of supercharged air discharged from the supercharger flows, not through the inter-cooler, but through the opened inter-cooler bypass passage, so that the supercharged air, which has been compressed by the supercharger and thereby increased in temperature, is distributed into the cylinders of the engine. As a result, in the low engine load range, the mechanical compressor supercharger is subjected to only a lighter load, so that the engine maintains well controlled emissions and improves fuel economy.

In the medium engine load range, wherein the supercharger bypass passage is open but the inter-cooler bypass passages is closed, the whole part of supercharged air discharged from the supercharger is delivered, not through the inter-cooler, but through the inter-cooler bypass passage, and is distributed into the cylinders of the engine, so that the cylinders can receive a sufficient amount of high temperature, supercharged air. Accordingly, in the medium engine load range, the mechanical compressor supercharger maintains well controlled emissions and improves fuel economy.

In the higher engine load range, wherein the supercharger bypass passage and the inter-cooler bypass passage are closed, the whole part of supercharged air discharged from the supercharger is cooled by the inter-cooler and is distributed into the cylinders of the engine, so that the cylinders can receive a cooled, sufficiently compressed supercharger air. This results in abnormal fuel combustion, such as is caused due to a high temperature of air, being prevented, and in an increase in charging efficiency by the aid of sufficiently compressed supercharged air.

In another specific embodiment, the intake system is provided with a return passage that branches off from the intake passage downstream of the inter-cooler and is connected to the intake passage upstream of the supercharger for allowing an intake air flow to return into the supercharger. Pneumatic valve means is further provided in the return passage for opening and closing the return passage according to engine operating conditions. These pneumatic valves are controlled by control means so as to open all of the supercharger bypass passage, the inter-cooler bypass passage and the return passage when the internal combustion engine operates in the range of lower loads, to close the supercharger bypass passage and the inter-cooler bypass passage but open the return passage when the internal combustion engine operates in the range of medium loads, and to close all of the supercharger bypass passage, the inter-cooler bypass passage and the return passage when the internal combustion engine operates in the range of higher loads.

According to the other disclosed specific embodiment, in the medium engine load range, the return passage is opened while both the supercharger bypass passage and the inter-cooler bypass passage are closed, so that a large part of supercharged air discharged from the supercharger flows through the inter-cooler and is delivered into the cylinders of the engine, and the remaining part of supercharged air, which is not drawn in the cylinders, returns into the intake passage upstream of the supercharger through the return passage. As a result, a necessary amount of cooled supercharged air is distributed into the cylinders, so as to prevent the occurrence of abnormal fuel combustion due to a high temperature of supercharged air and to provide a sufficient output power according to engine demands.

BRIEF DESCRIPTION OF THE DRAWINGS

The above and other objects and features of the present invention will be apparent from the following description of preferred embodiments thereof when considered with the accompanying drawings, wherein similar reference numbers have been used to designate the same or similar elements throughout the drawings, and in which.

DETAILED DESCRIPTION OF THE PREFERRED EMBODIMENTS

Because, in general, an internal combustion engine with a mechanical supercharger, for which an intake system in accordance with the present invention is used, is well known to those skilled in the art, the following description is directed particularly to elements forming part of, or cooperating with, the novel structure of the intake system in accordance with the present invention It is to be understood that the elements not specifically shown or described can take various forms well known to those skilled in the art.

Figure 1:
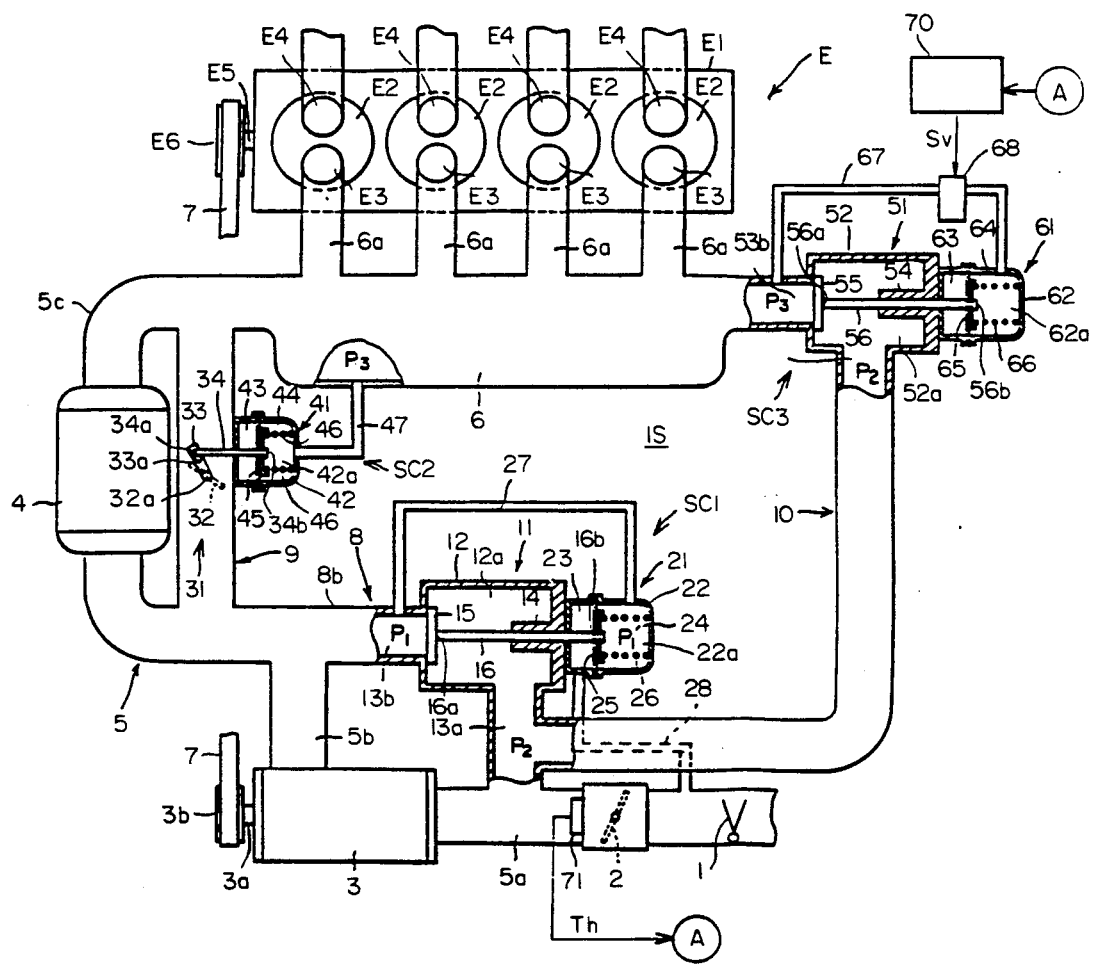
FIG. 1 is a schematic illustration showing an intake system in accordance with a preferred embodiment of the present invention.

Referring to the drawings, and in particular to FIG. 1, details of an intake system with a compressor supercharger according to a preferred embodiment of the present invention, used with an internal combustion engine, generally designated by a reference character E, is illustrated in a schematic view. The engine E is of, for instance, an in-line, four-cylinder, internal combustion type and has an engine block E1 formed with first to fourth cylinders E2. Intake and exhaust ports E3 and E4 open into each cylinder E2 and are opened and shut at a predetermined timing by intake and exhaust valves (not shown), respectively.

Intake air is introduced into the cylinders E2 through an intake system, generally designated by reference characters IS, having an intake passage, such as an intake pipe 5, and a surge tank 6. The intake ports E3 for the respective cylinders E2 in the engine block El are separately communicated with the surge tank 6 by way of discrete pipes 6a which are short in length. The intake pipe 5 comprises upstream, middle and downstream pipe segments 5a, 5b and 5c, respectively, and is provided with, from its upstream side, an upstream positioned air cleaner (not shown) at an upstream end of the upstream pipe segment 5a, an airflow meter 1 and a throttle valve 2 disposed in the upstream pipe segment 5a, a compressor supercharger 3 positioned between the upstream and middle pipe segments 5a and 5b, and an inter-cooler 4 disposed between the middle and downstream pipe segments 5b and 5c, all of which may be any type well known in structure and operation in the art.

Longitudinal axis of the compressor supercharger 3 is parallel to the crankshaft E5 of the engine E. A driven pulley 3b coaxially mounted on a drive shaft 3a of the supercharger 3 is operationally coupled to a drive pulley E6 coaxially mounted on the crankshaft E5 of the engine E by a belt 7, which transmits the engine output to drive the driven pulley 3b of the compressor supercharger 3.

A first bypass passage, or supercharger bypass passage, such as a bypass pipe 8, is connected between the upstream and middle stream pipe segments 5a and 5b so as to bypass the supercharger 3. This supercharger bypass pipe 8 comprises an upstream pipe segment 8a connecting first pneumatic, or pressure controlled, valve means SCl to the upstream pipe segment 5a of the intake pipe 5 between the throttle valve 2 and the compression supercharger 3, and a downstream pipe segment 8b connecting first pressure controlled valve means SCI to the middle pipe segment 5b of the intake pipe 5 between the compression supercharger 3 and the inter-cooler 4.

A second bypass passage, or inter-cooler bypass passage, such as a bypass pipe 9, is connected between the middle and downstream pipe segments 5b and 5c so as to bypass the inter-cooler 4. The inter-cooler bypass pipe 9 is provided with second pneumatic, or pressure controlled, valve means SC2.

A return passage, such as a return pipe 10, is connected between the first pressure controlled valve means SC1 and third pneumatic, or pressure controlled, valve means SC3, coupled to the downstream end of the surge tank 6.

First pneumatic valve means SCI comprises a pneumatic valve assembly 11 and pneumatic actuator means, such as a pressure operated actuator 21. The pneumatic valve assembly 11 comprises a rectangular parallelpiped or cylindrical valve housing 12 forming therein a pressure chamber 12a and having an upstream or inlet port 13a and a downstream or outlet port 13b with their longitudinal center axes intersecting each other at a right angle, and a mount 14 extending toward the outlet port 13b. A valve stem 16 is slidably supported by the mount 14 for axial movement with its one end 16a connected to a seal type valve body 15 located inside the valve housing 12 and with its other end 16b projecting outside the valve housing 12, so that the valve body 15 can move away from and closer to the outlet port 13b of the valve housing 12, thereby pneumatically connecting and disconnecting the upstream and downstream pipe segments 8a and 8b of the first bypass pipe 8.

Pneumatic actuator 21, which is attached to the valve housing 12 of the pneumatic valve assembly 11, comprises a rectangular parallelpiped, or cylindrical, actuator housing 22 forming therein a pressure chamber 22a and receiving therein the other end 16b of the valve stem 16, a retractable diaphragm 25 coupled to the other end 16b of the valve stem 16, and a coil spring 26 disposed so as to urge the retractable diaphragm 25 toward the pneumatic valve assembly 11 The retractable diaphragm 25 divides the pressure chamber 22a formed in the actuator housing 22 into two chambers, i.e., first and second pressure chambers 23 and 24, airtightly isolated from each other. The spring 26, which may be a compression spring, is placed in the second pressure chamber 24. However, if the spring 26 is an expanded tension spring, it may be placed in the first pressure chamber 23. The retractable diaphragm 25 has a pressure receiving area as large as a pressure receiving area of the valve body 15 which is substantially equal to the cross-sectional area of the outlet port 13b.

The second pressure chamber 24 of the actuator 21 is communicated with the outlet port 13b by way of a communication pipe 27 so as to introduce or transmit therein the pressure Pl in the outlet port 13b as a pressure P1'. Accordingly, the retractable diaphragm 25 receives a axial force equivalent to the difference between the pressure Pl in the outlet port 13b and the sum of the spring force of the compression spring 26 and the pressure P1' in the second pressure chamber 24 which act on the diaphragm in opposite directions.

First pressure chamber 23 may open into the atmosphere. However, it is preferred to communicate chamber 23 with the upstream pipe segment 5a of the intake pipe 5 upstream of the throttle body 2 by way of a communication pipe 28, so as to introduce or transmit therein negative pressure created by intake air introduced in the intake pipe 5 immediately before the throttle valve 3. If the first pressure chamber 23 opens to atmosphere, the valve body 15 is moved away from the outlet port 13b of the valve housing 12, or in a direction in which it opens the bypass passage 9 (which direction is hereinafter referred to as an "opening direction"). This is because pressure in the intake pipe 5 before and after the throttle valve 3 tends to be negative with respect to atmosphere when the throttle valve 3 is in the full throttle position or in a near full throttle positions. Such a negative pressure is introduced, or transmitted, into the pressure chamber 12a of the valve assembly 11 and acts on the valve body 12 so as to move it in the opening direction. However, because of the fact that the communication pipe 28 communicates the first pressure chamber 23 with the intake pipe 5 upstream of the throttle body 2, a negative pressure in the intake pipe 5 is also introduced, or transmitted, into the first pressure chamber 23 of the pneumatic actuator 21. As a result, the retractable diaphragm 25 connected to the valve body 15 through the valve stem 16 is deflected, or deformed, so as to move the valve body 15 in a direction in which the valve body 15 opens the bypass passage 9 (which direction is hereinafter referred to as a "closing direction") when the negative pressure is created by the throttle valve 3 in the full throttle position or in near full throttle positions.

When the engine E operates, the supercharger 3 is driven to introduce intake air therein through the air cleaner and the throttle valve 2, and compresses the intake air. Supercharged pressure Pl of the intake air is discharged and delivered, on one hand, toward the cylinders E2 through the inter-cooler 4, the surge tank 6 and the respective discrete pipes 6a in their intake cycles, respectively, and, on the other hand, into the outlet port 13b of the pneumatic valve assembly 11 through the downstream pipe segment 8b of the bypass pipe 8. The supercharged pressure P1, partly introduced into the outlet port 13b of the pneumatic valve assembly 11 acts on the valve body 15 in the opening direction. Simultaneously, negative pressure P2, is created by the intake air in the intake pipe 5 downstream of the throttle valve 2 and is introduced into the pressure chamber 12a of the pneumatic valve assembly 11 through the upstream pipe segment 8a of the bypass pipe 8 so as to act on the valve body 15. As a result, the valve body 15 is forced by not only the supercharged pressure P1, but also the negative pressure P2, in the opening direction.

On the other hand, the valve body 12 is urged in the closing direction by the compression coil spring 2 placed in the second pressure chamber 24 of the pneumatic actuator 21 through the restorable diaphragm 25 and the valve stem 16 and a pressure P1' introduced into the second pressure chamber 24 from the outlet port 13b of the pneumatic valve assembly 11 through the communication pipe 27 that is usually equal to the supercharger pressure P1. Because the valve body 15 has the same pressure receiving area as the pressure receiving area of the restorable diaphragm 25, the pressures P1 and P1' acting on the valve 15 in the opposite directions are cancelled, so that the valve body 15 is forced by and according to the difference between the compression force of the spring 26 acting on the valve body 15 in the closing direction and the negative pressure P2 in the pressure chamber 12a of the pneumatic valve assembly 11 acting on the valve body 15 in the opening direction to open or close the outlet port 13b, and hence, the bypass passage 8.

Specifically, when the engine E operates in a range of lower or lighter loads where the throttle valve 3 is in the idle position, or closed position, or in smaller opening positions and develops a higher negative pressure P2 in the pressure chamber 12a of the pneumatic valve assembly the valve body 15 of the pneumatic valve assembly 11 is forced by the negative pressure P2 against the compression coil spring 26 to open the outlet port 13b, so as to open the bypass pipe 8. With the movement of the valve body in the opening direction, the valve body 15 increases the air flow of intake air in the bypass pipe 8. As a result, in the range of lower or lighter loads, wherein it is not required for the engine E to be supercharged with a high pressure of intake air, the whole part of, or a large part of, intake air introduced into the intake pipe 5 is directed toward the respective cylinders E2 through the bypass pipe 9. Accordingly, the supercharger 3 is subjected only to a lower or lighter load. When the engine E operates in a range of higher or heavier loads where the throttle valve 3 is in the full throttle position, or fully opened position, or in larger opening positions and creates a lower negative pressure P2 in the pressure chamber 12a of the valve housing 12 of the pneumatic valve assembly 11, the valve body 15 of the pneumatic valve assembly 11 is forced mainly by the compression coil spring 26 to move closer to the outlet port 13b in the closing direction. With the movement of the valve body 15 to the outlet port 13b, the air flow of intake air in the bypass pipe 8 is reduced. When the negative pressure P2 is sufficiently low, the valve body 15 completely closes the outlet port 13b, so as to shut down the air flow of intake air in the bypass pipe 8.

Second pneumatic valve means SC2 comprises a butterfly type of control valve assembly 31 and pneumatic actuator means, such as a pneumatic actuator 41. The control valve assembly 31 comprises a butterfly valve body 32 rigidly connected to a pivot shaft 32a supported by the inter-cooler bypass pipe 9. The pivot shaft 32a is rigidly connected to a coupling arm 33 formed with an elongated slot 33a. A valve actuating rod 34, slidably supported by the inter-cooler bypass pipe 9, is operationally coupled to the pivot shaft 32a with its one end 34a engaged in the elongated slot 33a of the coupling arm 33. When the valve actuating rod 34 moves, the butterfly valve 32 is turned to open or close the inter-cooler bypass pipe 9.

Pneumatic actuator 41, which is attached to the inter-cooler bypass pipe 9, comprises a rectangular parallelpiped or cylindrical actuator housing 42 forming therein a pressure chamber 42a and receiving therein the other end 34b of the valve actuating rod 34, a retractable diaphragm 45 coupled to the other end 34b of the valve actuating rod 34 and a coil spring 46 disposed so as to urge the retractable diaphragm 45 toward the valve assembly 31. The retractable diaphragm 45 divides the pressure chamber 42a formed in the actuator housing 42 into two chambers, i.e., first and second pressure chambers 43 and 44, air-tightly isolated from each other. The coil spring 46, which may be a compression spring, is placed in the second pressure chamber 44. However, the spring 46, if it is an expanded tension spring, may be placed in the first pressure chamber 43. The second pressure chamber 44 of the pneumatic actuator 41 is communicated with the surge tank 6 by way of a communication pipe 47 so as to introduce or transmit thereto pressure P3 in the surge tank 6.

In a range of lower, or lighter, engine loads, wherein the supercharger 3 does not operate to provide supercharged pressure, or operates to provide only a low supercharged pressure, to the engine E, and the pressure P3 in the surge tank 6 is negative, the retractable diaphragm 45 is deflected, or deformed, by the negative pressure P3 against the compression spring 46 to turn the butterfly valve 32 in a clockwise direction as viewed in FIG. 1 so as to open the inter-cooler bypass pipe 9. However, in a range of higher, or heavier, engine loads, wherein the supercharger 3 operates to provide a high supercharged pressure to the engine E, and the pressure P3 in the surge tank 6 is positive, the retractable diaphragm 45 is: deflected, or deformed, by the supercharged pressure P3 and &:he compression spring 46 to turn the butterfly valve 32 in the counterclockwise direction so as to close the inter-cooler bypass pipe 9.

Third pneumatic, or pressure controlled, valve means SC3 comprises a pneumatic valve assembly 51 and pneumatic actuator means, such as a pneumatic actuator 6!. The pneumatic valve assembly 51 comprises a rectangular parallelpiped, or cylindrical, valve housing 52, forming therein a pressure chamber 52a and having an upstream or outlet port 53a and a downstream or inlet port 53b with their longitudinal center,maxes intersecting each other at a right angle, and a mount 54 extending toward the inlet port 53b. The outlet port 53a communicates the pressure chamber 52a with the return pipe 10 so as to introduce the negative pressure P2 in the outlet port 53a of the pneumatic valve assembly 51 into the pressure chamber 52a; the inlet port 53b communicates the pressure chamber 52a with the surge tank 6 so as to introduce therein the pressure P3 in the surge tank 6. A valve stem 56 is slidably supported by the mount 54 for axial movement with its one end 56a connected to a seal type valve body 55 located inside the valve housing 52 and its other end 56b projecting outside the valve housing 52, so that the valve body 55 can move away from and closer to the inlet port 53b of the valve housing 52, thereby pneumatically connecting and disconnecting the return pipe 10 from the surge tank 6.

Pneumatic actuator 61, which is attached to the valve housing 52 of the pneumatic valve assembly 51, comprises a rectangular parallelpiped, or cylindrical, actuator housing 62 forming therein a pressure chamber 62a and receiving therein the other end 56b of the valve stem 56, a retractable diaphragm 65 coupled to the other end 56b of the valve stem 56, and a coil spring 56 disposed so as to urge the retractable diaphragm 65 toward the pneumatic valve assembly 51. The retractable diaphragm 65 divides the pressure chamber 62a formed in the actuator housing 62 into two chambers, i.e., first and second pressure chambers 63 and 64, air-tightly isolated from each other. The spring 66, which may be a compression spring, is placed in the second pressure chamber 64. The spring 66, if it is an expanded tension spring, may be placed in the first pressure chamber 63. The retractable diaphragm 65 has a pressure receiving area as large as a pressure receiving area of the valve body 55. The first pressure chamber 63 opens into atmosphere; the second pressure chamber 64 of the actuator 61 is communicated with the inlet port 53b by way of a communication pipe 67 so as to introduce or transmit thereto the pressure P3 in the surge tank 6. Accordingly, the retractable diaphragm 65 receives an axial force equivalent to the difference between the pressure P3 in the inlet port 53b and the sum of the spring force of the compression spring 66 and the pressure in the second pressure chamber 64 which act on the diaphragm 6 in opposite directions. The communication pipe 67 is provided with an electrically controlled valve, such as a solenoid valve 68.

The intake system includes a control unit 70, basically comprising a general purpose microcomputer, which receives an electric signal Th representative of the opening, or operated throttle position, of the throttle valve 3 provided from a throttle opening sensor 71, well known in the art, and outputs, in response to the electric signal, a control signal Sv to the solenoid valve 68. In particular, the control unit 70, when receiving an electric signal Th representative of a opening of the throttle valve 3 larger than a predetermined critical opening to which the throttle valve 3 opens, when the engine E operates at lower, or lighter, loads, causes the solenoid valve 68 to close or shut the communication pipe 67. The control unit 70, on the other hand, causes the solenoid valve 68 to open the communication pipe 67 when an engine load becomes higher, or heavier, than a predetermined specific value that is detected, at a specific opening of the throttle valve 3 which is slightly smaller than the full throttle opening of the throttle valve 3, by the throttle opening sensor 71.

When the engine E operates at lower, or lighter, engine loads, the valve body 55 receives, in opposite directions, the negative pressures P2 and P3 introduced into the outlet and inlet ports 53a and 53b of the valve assembly 51, respectively, and is urged in the closing direction by the compression coil spring 66 of the pneumatic actuator 61. As a result, the seal valve body 55 closes the inlet port 53b, so as to shut the return pipe 10. In the higher engine load range, which term refers to middle and high engine loads, the solenoid valve 68 is caused to open the communication pipe 67 so as to introduce the pressure P3 in the surge tank 6, which is positive, into the second pressure chamber 64 of the pneumatic actuator 61. Accordingly, the pressure P3 acting on the valve body 55 in the closing direction is cancelled by the pressure in the second pressure chamber 64 of the actuator 61 acting on the valve body 55.

Summarizing the operations of the first to third pressure controlled valve means SC1, SC2 and SC3 of the intake system shown in FIG. 1, the following combinations of operations are realized according to engine load conditions.

| Engine Load | First Valve Means (SC1) | Second Valve Means (SC2) | Third Valve Means (SC3) |
| --- | --- | --- | --- |
| Lower Loads | Open | Open | Closed |
| Middle Loads | Closed | Closed | Open |
| Higher Loads | Closed | Closed | Closed |

In operation of the intake system depicted in FIG. 1, in the range of lower, or lighter, engine loads where the throttle valve 3 opens to smaller openings so as to aspirate a small amount of intake air and, therefore, the supercharged air from the supercharger 3 does not become positive, the first and second pressure controlled valve means SCI and SC2 open; the third pressure controlled valve means SC3 closes, so that the supercharger bypass pipe 8 and inter-cooler bypass pipe 9 are directly communicated with each other and the return pipe 10 is shut down. Accordingly, in the low engine load range, part of the supercharged air discharged into the middle pipe segment 5b of the intake pipe 5 from the supercharger 3 returns into the upstream intake pipe 5 from the supercharger 3 returns into the upstream pipe segment 5a of the intake pipe 5 through the opened supercharger bypass pipe 8, causing a decrease in the difference between pressure before and after the supercharger 3, so as to decrease load against the supercharger 3. The remaining part of the supercharged air discharged into the middle pipe segment 5b of the intake pipe 5 from the supercharger 3 flows into the surge tank 6, passing not through the inter-cooler 4 and the downstream pipe segment 5c of the intake pile 5, but through the inter-cooler bypass pipe 9, and is distributed into the respective cylinders E2 through the discrete pipes 6a, respectively. As a result, in the low engine load range, the intake system causes a decrease in driving loss of the supercharger 3 and a raise in temperature of the intake air compressed by the supercharger 3, so as to cause a decrease in pumping loss of the engine and to improve the vaporization, or atomization, of fuel. This results in an improvement of fuel economy and in a decrease in the hydrocarbon (HC) content of emission gases.

In a range of middle engine loads, where, with an increase in opening of the throttle valve, the intake system increases the amount of intake air aspirated therein and the supercharger 3 discharges a positive pressure of supercharge air, the first and second pressure controlled valve means SCI and SC2 close. The third pressure controlled valve means SC3 opens, so that both of the supercharger bypass pipe 8 and inter-cooler bypass pipe 9 are shut down, and the return pipe 10 is opened. In this low engine load range, therefore, the whole part of the supercharge air discharged into the middle pipe segment 5b of the intake pipe 5 from the supercharger 3 flows into the surge tank 6, passing through the inter-cooler 4 and the downstream pipe segment 5c of the intake pipe 5, and is distributed into the respective cylinders E2 through the discrete pipes 6a, respectively. Residual supercharged air in the surge tank 6 returns to the upstream pipe segment 5a of the intake pipe 5 through the return pipe 10 opened by the third pressure controlled valve means SC3. Therefore, in the middle engine load range, the engine E provides its output depending upon the amount of intake air which corresponds to the engine load at which the engine operates. Also, the supercharged air which is provided with an increase in temperature, discharged from the supercharger 3 is cooled by the inter-cooler.

In a range of higher, heavier, engine loads, where the throttle valve 2 is at the full throttle position or near the full throttle position, the intake system aspirates a greatly increased amount of intake air therein and, therefore, the supercharger 3 discharges a higher positive pressure of supercharged air, and all of the pressure controlled valve means SC1, SC2 and SC3 close. Accordingly, in the high engine load range, the whole part of the supercharged air discharged into the middle pipe segment 5b of the intake pipe 5 from the supercharger 3 flows into the surge tank 6, passing through the inter-cooler 4, and is distributed into the respective cylinders E2 through the discrete pipes 6a, respectively. Each cylinder E2 is supplied with a sufficient amount of supercharged air, with an increased charging efficiency, which is sufficiently compressed by the supercharger 3 and is cooled by the inter cooler 4, so that the engine provides a higher output.

Figure 2:
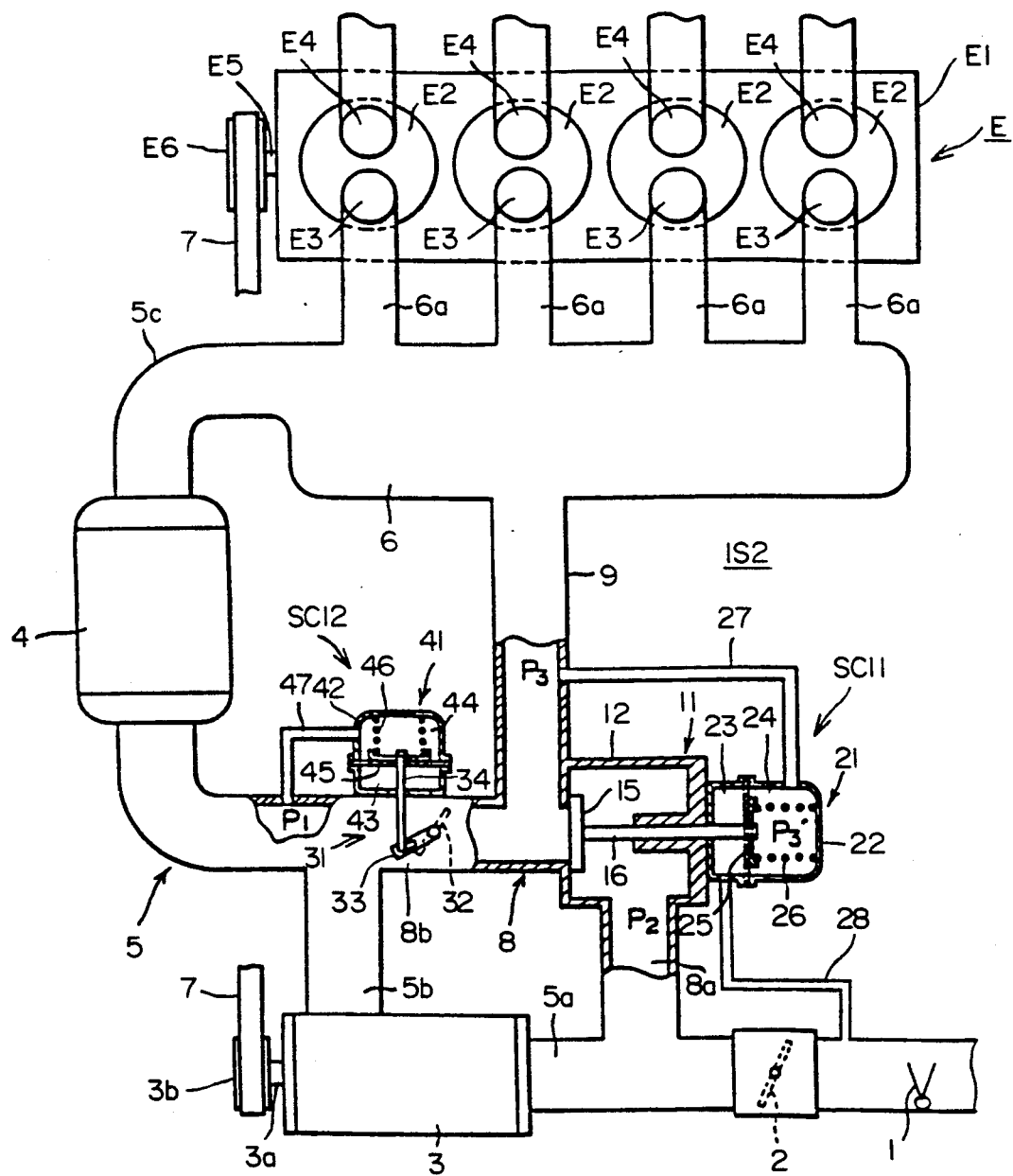
FIG. 2 is a schematic illustration showing an intake system in accordance with another preferred embodiment of the present invention.

Referring to FIG. 2, an intake system in accordance with another preferred embodiment of the present invention is shown, including first and second pneumatic, or pressure operated, valve means SC11 and SC12 located in a supercharger bypass passage.

The intake system, generally designated by reference characters IS2, introduces, or aspirates, intake air into the cylinders E2 through an intake passage, such as an intake pipe 5, and a surge tank 6. The intake ports E3 for the respective cylinders E2 in the engine block E1 are separately communicated with the surge tank 6 by way of discrete pipes 6a. The intake pipe 5 comprises upstream, middle and downstream pipe segments 5a, 5b and 5c, respectively, and is provided with, from its upstream side, an upstream positioned air cleaner (not shown) at an upstream end of the upstream pipe segment 5a, an airflow meter 1 and a throttle valve 2 disposed in the upstream pipe segment 5a, a compressor supercharger 3 positioned be&:ween the upstream and middle pipe segments 5a and 5b, and an inter-cooler 4 disposed between the middle and downstream pipe segments 5b and 5c. All of these elements are the same in structure and operation as those of the intake system shown in FIG. 1.

A first bypass passage, or supercharger bypass passage, such as a bypass pipe 8, is connected between the upstream and middle stream pipe segments 5a and 5b so as to bypass the supercharger 3. This supercharger bypass pipe 8 comprises an upstream pipe segment 8a connecting the first pneumatic valve means SC11 to the upstream pipe segment 5a of the intake pipe 5 between the throttle valve 2 and the compression supercharger 3, and a downstream pipe segment 8b connecting the first pneumatic valve means SC1 to the middle pipe segment 5b of the intake pipe 5 between the compression supercharger 3 and the inter-cooler 4.

A second bypass passage, or inter-cooler bypass passage, such as a bypass pipe 9, is connected between the downstream pipe segment 8b of the supercharger. bypass pipe 8 and the surge tank 6 so as to bypass the inter-cooler 4.

A second pneumatic valve mean SC12 is provided in the downstream pipe segment 8b of the supercharger bypass pipe 8 between the middle pipe segment 5b of the intake pipe 5 and the inter-cooler bypass passage 9.

First and second pneumatic valve means SC11 and SC12 themselves are the same in structure and operation as the first and second pneumatic valve means SCI and SC2 of the previous embodiment shown in FIG. 1, and are not described again. However, the first pneumatic valve means SC11 includes a communication pipe 27 that communicates second pressure chamber 24 of the pneumatic actuator 21, not with an outlet port 13b of the pneumatic valve assembly 11, but with the inter-cooler bypass pipe 9. The second pneumatic valve means SC12 includes a communication pipe 47 that communicates second pressure chamber 44 of the actuator 41, not with the surge tank 6, but with the middle pipe segment 5b of the intake pipe 5.

Because the valve body 15 is forced by pressure P3 created in the inter-cooler bypass pipe 9 and pressure P3' introduced into the second pressure chamber 24 of the pneumatic actuator 21 in opposite directions, and the pressure P3 and P3' are generally equal to each other, the valve body 15 is forced substantially only by, and according to, the difference between the compression force of the spring 26 acting on the valve body 15 in the closing direction and negative pressure P2 created in the pressure chamber 12a of the pneumatic valve assembly 11 by intake air in the upstream pipe segment 5a of the intake pipe 5 and acting on the valve body 15 in the opening direction so as to open or close the outlet port 13b, and hence, the inter-cooler bypass passage 8.

The second pneumatic valve means SC12 operates so that when supercharge pressure P1 discharged from the supercharger 3 is negative, the retractable diaphragm 45 is deflected, or deformed, by the negative supercharge pressure P1 against the compression spring 46 to turn the butterfly valve 32 in a clockwise direction as viewed in FIG. 2, thereby opening the downstream pipe segment 8b of the supercharger bypass pipe 8 so as to communicate the middle pipe segment 5b of the intake pipe 5 with the inter-cooler bypass pipe 9, and hence, the surge tank 6. On the contrary, in a range of higher, or heavier, engine loads, wherein the supercharger 3 operates to provide a high supercharger pressure for the engine E and, accordingly, the pressure P1 discharged from the supercharger 3 is positive, the retractable diaphragm 45 is deflected, or deformed, by the negative supercharger pressure P1 and the compression spring 46 to turn the butterfly valve 32 in the counterclockwise direction, thereby closing the downstream pipe segment 8b of the supercharger bypass pipe 8 so as to disconnect the middle pipe segment 5b of the intake pipe 5 from the intercooler bypass pipe 9, and hence, the surge tank 6.

First and second pneumatic valve means SC11 and SC12 of the intake system IS2 shown in FIG. 2 are controlled according to engine loads as follows:

| Engine Load | First Valve Means (SC11) | Second Valve Means (SC12) |
| --- | --- | --- |
| Lower Loads | Open | Open |
| Middle Loads | Partially Open | Closed |

| Engine Load | First Valve Means (SC11) | Second Valve Means (SC12) |
| --- | --- | --- |
| Higher Loads | Closed | Closed |

Figure 3A:
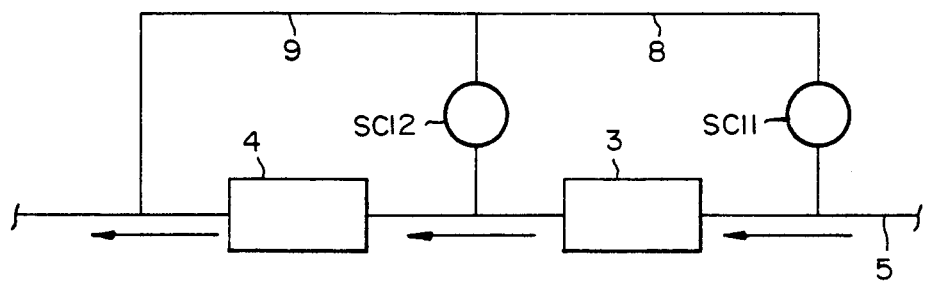
FIGS. 3A-3D are diagrammatical illustrations of air flow.
Figure 3B:
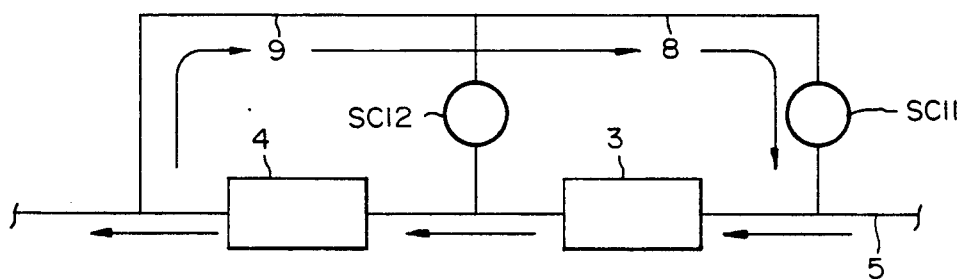
Figure 3C:
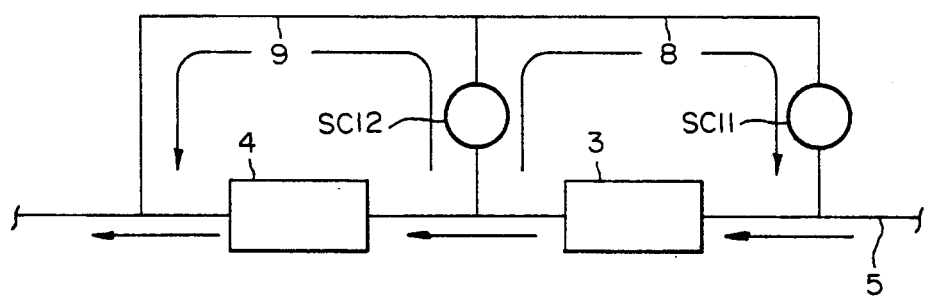

FIGS. 3A-3C illustrate various air flow patterns in the intake system which are realized by the combinations of operation of the first and second pneumatic valve means SC11 and SC12 shown above.

As is apparent from the above combinations of operation of the first and second pneumatic valve means SC11 and SC12, in a range of lower engine loads, where the supercharger pressure P1 discharged from the supercharger 3 is negative, both the first and second pneumatic valve means SC11 and SC12 open so as to communicate the inter-cooler bypass passage 9 with the intake pipe 5 both upstream and downstream of the supercharger 3. Part of the supercharged air discharged from the supercharger 3 returns into the upstream pipe segment 5a of the intake pipe 5 upstream of the supercharger 3 through the supercharger bypass pipe 8. The remaining part of the supercharged air discharged from the supercharger 3 flows into the surge tank 6 passing, not through the inter-cooler 4, but through the inter-cooler bypass pipe 9, and is distributed into the respective cylinders E2 through the discrete pipe 6a. As a result, in the low engine load range, the difference in pressure in the intake pipe before and after the supercharger 3 becomes small, so that the supercharger 3 is subjected to only a small load and, therefore, causes a decrease in driving loss. Furthermore, because the supercharged air is not cooled by the inter-cooler 4, a high temperature of supercharged air compressed by the supercharger is distributed to the cylinders E2. This results in an improvement of fuel economy and in an decrease in the hydrocarbon (HC) content of emission gases.

In a range of middle engine loads where the supercharger 3 discharges positive supercharge pressure P1 and negative pressure P2 is in a medium pressure range, the first pneumatic valve means SC11 partially open so as to communicate the inter-cooler bypass passage 9 with upstream pipe segment 5a of the intake pipe 5 upstream of the supercharger 3. However, the second pneumatic valve means SC12 closes so as to shut down, or disconnect, the inter cooler bypass passage 9 from the middle pipe segment 5b of the intake pipe 5 downstream of the supercharger 3. The whole part of the supercharged air discharged from the supercharger 3 flows into the surge tank 6 passing through the inter-cooler 4. The supercharged air in the surge tank 6 is distributed mostly into the respective cylinders E2 through the discrete pipe 6a and a small part of the supercharged air in the surge tank 6 returns into the upstream pipe segment 5a of the intake pipe 5 upstream of the supercharger 3 through the inter-cooler bypass pipe 9 and supercharger bypass pipe 8. As a result, in the middle engine load range, the cylinders E2 of the engine E are, respectively, supplied with a necessary amount of cooled supercharged air which corresponds to the engine load at which the engine operates, so as to provides a required power output.

In a range of higher, or heavier, engine loads, where the throttle valve 2 opens near or to the full throttle position and, thereby, the supercharger 3 discharges positive supercharge pressure P1 and the negative pressure P2 becomes lower, both the first and second pneumatic valve means SC11 and SC12 close. Accordingly, in the high engine load range, the whole part of the supercharged air sufficiently compressed by and discharged from the supercharger 3 flows into the surge tank 6, passing through the inter-cooler 4 and is distributed into the respective cylinders E2 of the engine E2 through the discrete pipes 6a, respectively. Each cylinder E2 is supplied with a sufficient amount of supercharged air, with an increased charging efficiency, so that the engine provides a higher power output.

In the above embodiment, the second pneumatic valve means SC12 may be incorporated in the inter-cooler bypass passage 9 downstream of the communication pipe 27 of the first pneumatic valve means SC1. In this case, the first and second pneumatic valve means SC11 and SC12 must be controlled as follows:

| Engine Load | First Valve Means (SC11) | Second Valve Means (SC12) |
| --- | --- | --- |
| Lower Loads | Open | Open |
| Middle Loads | Closed | Open |
| Higher Loads | Closed | Closed |

As apparent from the above combinations of operation of the first and second pneumatic valve means SC11 and SC12, in a range of lower engine loads, part of the supercharged air discharged from the supercharger 3 returns directly into the upstream pipe segment 5a of the intake pipe 5 upstream of the supercharger 3 through the supercharger bypass pipe 8. The remaining part of the supercharged air discharged from the supercharger 3 flows into the surge tank 6 passing through the inter-cooler bypass pipe 9 and is distributed into the respective cylinders E2 through the discrete pipe 6a. As a result, in the low engine load range, the difference in pressure in the intake pipe before and after the supercharger 3 becomes small, so that the supercharger 3 causes a decrease in driving loss. Furthermore, because the supercharged air is not cooled by the inter-cooler 4, a high temperature of the supercharged air compressed by the supercharger 3 is distributed into the cylinders E2. This results in an improvement of fuel economy and in an decrease in the hydrocarbon (HC) content of emission gases.

In a range of middle engine loads, the whole part of the supercharged air discharged f:.om the supercharger 3 flows into the surge tank 6 passing, not through the inter-cooler 4, but through the inter-cooler bypass passage 9 and is distributed into the respective cylinders E2 through the discrete pipe 6a. As a result, in the middle engine load range, the cylinders E2 of the engine E are, respectively, supplied with a necessary amount of, and a high temperature of, supercharged air. This also results in an improvement of fuel economy and in an decrease in the hydrocarbon (HC) content of emission gases.

In a range of higher, or heavier, engine loads, the whole part of the supercharged air discharged from the supercharger 3 flows into the surge tank 6 passing through the inter-cooler 4 and is distributed into the respective cylinders E2 of the engine E2 through the discrete pipes 6a, respectively. Each cylinder E2 is supplied with a sufficient amount of cooled supercharged air. Therefore, an increase in charging efficiency is caused, so that the engine provides a higher power output.

Figure 3D:
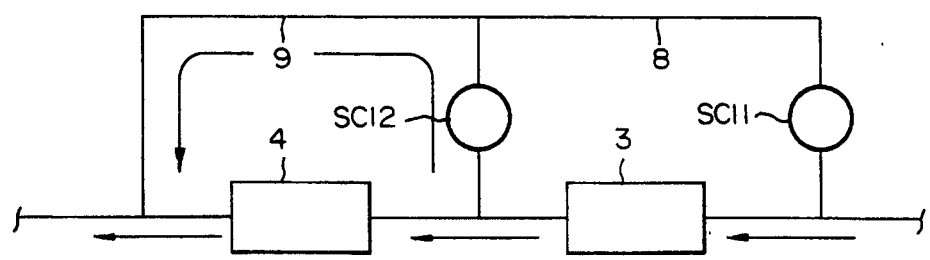

Because of the fact that supercharger pressure is relatively low in a range of low engine speeds and, therefore, the temperature of supercharged air is not raised so high and it is necessary for the engine to raise its output power in a range of high loads by reducing the resistance of intake air, it is advantageous to gain a high charging efficiency in the low speed, high load range. This advantage can be obtained by modifying the intake system IS2 so as to provide another air flow pattern a shown in FIG. 3D by opening partially the second valve means SC12 while closing the first valve means SC11.

Figure 4:
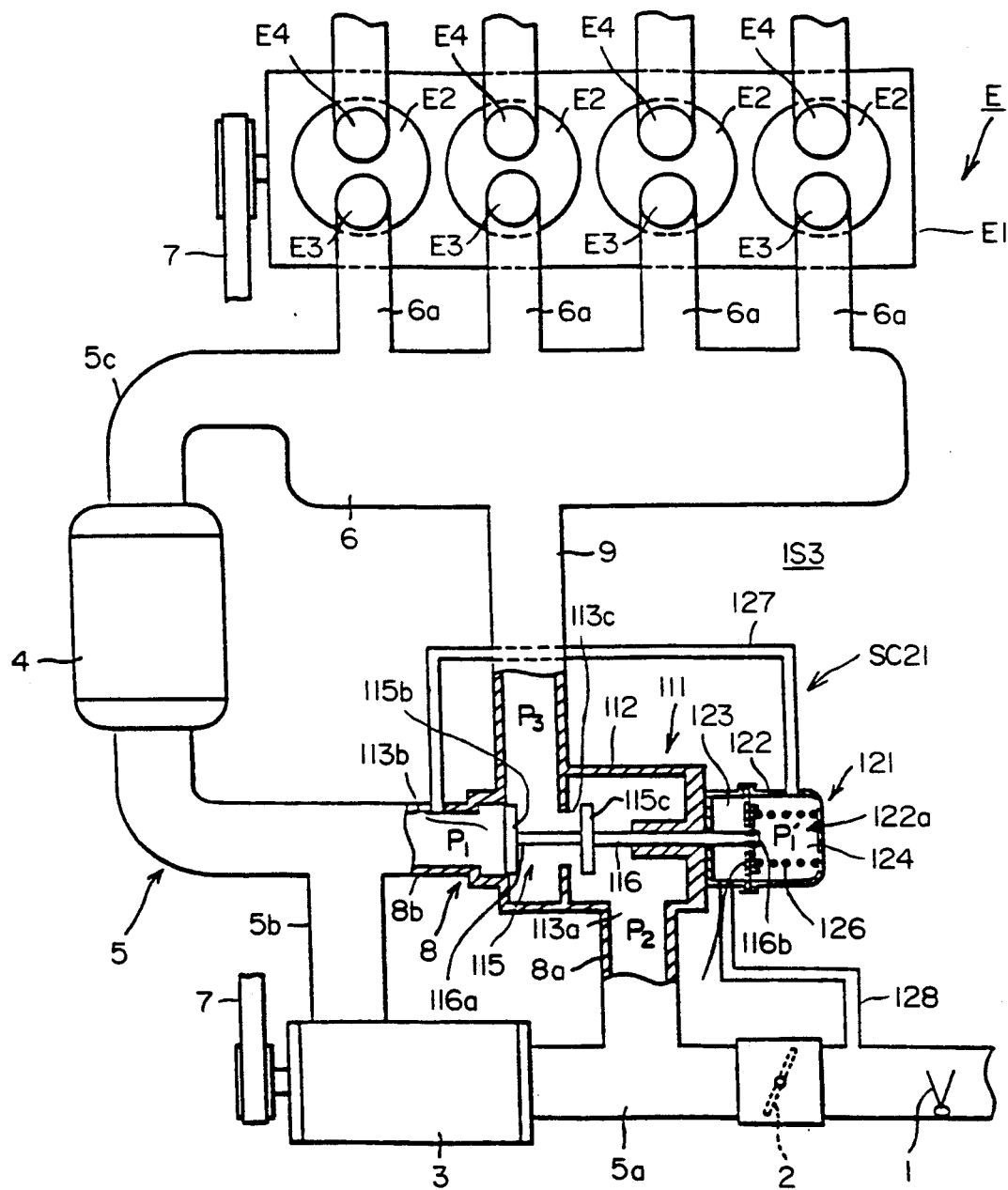
FIG. 4 is a schematic illustration showing an intake system in accordance with still another preferred embodiment of the present invention.

Referring to FIG. 4, an intake system in accordance with another preferred embodiment of the present invention is shown, comprising pneumatic, or pressure operated, valve means located in a supercharger bypass passage.

The intake system, generally designated by reference characters IS3, introduces, or aspirates, intake air into the cylinders E2 through an intake passage, such as an intake pipe 5, and a surge tank 6. The intake ports E3 for the respective cylinders E2 of the engine E ar separately communicated with the surge tank 6 by way of discrete pipes 6a. The intake pipe 5 comprises upstream, middle and downstream pipe segments 5a, 5b and 5c, respectively, and is provided with, from its upstream side, an upstream positioned air cleaner (not shown) at an upstream end of the upstream pipe segment 5a, an airflow meter 1 and a throttle valve 2 disposed in the upstream pipe segment 5a, a compressor supercharger positioned between the upstream and middle pipe segments 5a and 5b, and an inter-cooler 4 positioned between the middle and downstream pipe segments 5b and 5c. All of these elements are the same in structure and operation as those of the intake system shown in FIG. 1.

A bypass passage, or supercharger bypass passage, such as a bypass pipe 8, is connected between the upstream and middle stream pipe segments 5a and 5b so as to bypass the supercharger 3. This supercharger bypass pipe 8 comprises an upstream pipe segment 8a connecting pneumatic, or pressure operated, valve means SC21 to the upstream pipe segment 5a of the intake pipe 5 between the throttle valve 2 and the compressor supercharger 3, and a downstream pipe segment 8b connecting the pneumatic valve means SC21 to the middle pipe segment 5b of the intake pipe 5 between the compression supercharger 3 and the inter-cooler 4.

Second bypass passage, or inter-cooler bypass passage, such as a bypass pipe 9, is connected between the first pneumatic valve means SC21 and the surge tank 6 so as to bypass the inter-cooler 4.

Pneumatic valve means SC21 comprises a pneumatic valve assembly 111 and actuator means, such as a pneumatic, or pressure operated, actuator 121. The pneumatic valve assembly 111 comprises a rectangular parallelpiped, or cylindrical, valve housing 112 forming therein a pressure chamber 112a and having an upstream or inlet port 113a, a downstream or outlet port 113b and an intermediate port 113c coaxial with the outlet port 113b. The inlet port 113a has a center axis intersecting both center axes of the outlet port 113b and intermediate port 113c. The valve housing 112 further has a mount extending toward the first outlet port 113b. A valve stem 106 is slidably supported by the mount for axial movement with its one end 116a connected to a seal type twin valve body 115 having a first valve body 115b and a second valve body 115c and with its other end 116b projecting outside the valve housing 112, so that the first and second valve bodies 115b and 115c can move away from and closer to the outlet port 113b and intermediate port 113c of the valve housing 112, respectively. The first and second valve bodies 115b and 115c are the same in pressure receiving area. The first valve body 115b connects and disconnects the downstream pipe segment 8b of the supercharger bypass pipe 8 from the inter-cooler bypass passage 9; the second valve body 115c connects and disconnects the upstream pipe segment 8a of the supercharger bypass pipe 8 from the inter-cooler bypass passage 9. It is to be noted that the outlet port 113b has a depth sufficient for the first valve body 115b to maintain the disconnection between the downstream pipe segment 8b of the supercharger bypass pipe 8 and the inter-cooler bypass passage 9, while the second valve body 115c moves between a disconnecting, or closing, position where it disconnects the upstream pipe segment 8a of the supercharger bypass pipe 8 from the inter-cooler bypass passage 9 and a partially opening position where it is slightly away the intermediate port 113c. Therefore, the twin valve body 115, when moving toward the outlet port 113b, completely closes the outlet port 113b first and then the intermediate port 113c.

Pneumatic actuator 121, which is attached to the valve housing 112 of the pneumatic valve assembly 111, comprises a rectangular parallelpiped, or cylindrical, actuator housing 122 forming therein a pressure chamber 122a and receiving therein the other end 116b of the valve stem 116, a retractable diaphragm 125 coupled to the other end 116b of the valve stem 116 and a coil spring 126 disposed so as to urge the retractable diaphragm 125 toward the pneumatic valve assembly 111. The retractable diaphragm 125 has the same pressure receiving area as those of the first and second valve bodies 115b and 115c and divides the pressure chamber 122a formed in the actuator housing 122 into two chambers, i.e., first and second pressure chambers 123 and 124, air-tightly isolated from each other. The spring 126, which may be a compression spring, is placed in the second pressure chamber 124. However, the spring 126, if it is an expanded spring, may be placed in the first pressure chamber 123. The retractable diaphragm 125 has a pressure receiving area as large as a pressure receiving area of the valve body 115 that is substantially equal to the cross-sectional area of the outlet port 113b. The second pressure chamber 124 of the pneumatic actuator 121 is communicated with the downstream pipe segment 8b of the supercharger bypass pile 8 by way of a communication pipe 127 so as to introduce, or transmit, thereto the pressure Pl in the outlet port 113b as a pressure P1'. Accordingly, the retractable diaphragm 125 receives an axial force equivalent to the difference between the pressure P1 in the outlet port 113b and the sum of the spring force of the compression spring 126 and the pressure P1' in the second pressure chamber 124 both of which act on the retractable diaphragm 125 in opposite directions. Pressure P3 in the inter-cooler bypass pipe 9 acts on both the first and second valve bodies 105b and 105c but in opposite directions. Due to the fact that the pressure P1' in the second pressure chamber 124 is generally equal to the press::re Pl in the outlet port 113b, the twin valve body 115 is forced by and according to the difference between the compression force of the spring 126 acting on the twin valve body 115 in the closing direction and the negative pressure P2 in the pressure chamber 112a of the pneumatic valve assembly 111 acting on the valve body 115 in the opening direction to open or close the outlet port 113b and intermediate port 113c, and hence, the supercharger bypass pipe 8 and inter-cooler bypass pipe 9.

First pressure chamber 123 is communicated with the upstream pipe segment 5a of the intake pipe 5 upstream of the throttle body 2 by way of a communication pipe 128 so as to introduce or transmit therein negative pressure created by intake air introduced in the intake pipe 5 immediately before the throttle valve 3.

Pneumatic valve means SC21 of the intake system shown in FIG. 4 is controlled according to engine loads as follows:

| Engine Load | First Valve Body (115b) | Second Valve Body (115c) |
|---|---|---|
| Lower Loads | Open | Open |
| Middle Loads | Closed | Partially Open |
| Higher Loads | Closed | Closed |

As apparent from the above combinations of operation of the pneumatic valve means SC21, in a range of lower engine loads, where the supercharger pressure P1 discharged from the supercharger 3 is negative, both the first and second valve bodies 105b and 105c of the pneumatic valve means SC21 open so as to communicate both the upstream pipe segment 8a of the supercharger bypass pipe 8 and the inter-cooler bypass passage 9 with the downstream pipe segment 8b of the supercharger bypass pipe 8, and hence, the middle pipe segment 5b of the intake pipe 5. Part of the supercharged air discharged from the supercharger 3 returns into the upstream pipe segment 5a of the intake pipe 5 upstream of the supercharger 3 through the supercharger bypass pipe 8; the remaining part of the supercharge air discharged from the supercharger 3 flows directly into the surge tank 6 passing, not through the inter-cooler 4, but through the inter-cooler bypass pipe 9, and is distributed into the respective cylinders E2 through the discrete pipe 6a. As a result, in the low engine load range, the difference in pressure in the intake pipe before and after the supercharger 3 becomes small, so that the supercharger 3 is subjected to only a small load and, therefore, causes a decrease in driving loss. Furthermore, because the supercharge air is not cooled by the inter-cooler 4, high temperature supercharged air compressed by the supercharger 3 is distributed to the cylinders E2. This results in an improvement of fuel economy and in an decrease in the hydrocarbon (HC) content of emission gases.

In a range of middle engine loads, where the supercharger 3 discharges positive supercharger pressure P1 and negative pressure P2 is in a medium pressure range, while the second valve body 115c of the pneumatic valve means SC21 is still, but partially, open, completely closed. Accordingly, both the upstream pipe segment 8a of the supercharger bypass pipe 8 and the inter-cooler bypass passage 9 are disconnected from the downstream pipe segment 8b of the supercharger bypass pipe 8, and hence, the middle pipe segment 5b of the intake pipe 5. The inter-cooler bypass passage 9 is connected, or communicated, pneumatically partially with the upstream pipe segment 8a of the supercharger bypass pipe 8. The whole part of the supercharge air discharged from the supercharger 3 flows into the surge tank 6 passing through the inter-cooler 4 and is distributed mostly into the respective cylinders E2 through the discrete pipe 6a. As a result, in the middle engine load range, the cylinders E2 of the engine E are, respectively, supplied with a necessary amount of cooled supercharged air which corresponds to the engine load at which the engine operates, so as to provide a required power output.

In a range of higher, or heavier, engine loads, where the throttle valve 2 opens near to or at the full throttle position and, thereby, the supercharger 3 discharges a positive supercharger pressure P1 and negative pressure P2 becomes lower, both the first and second valve bodies 115b and 115c of the pneumatic valve means SC21 close. Accordingly, in the high engine load range, the whole part of the supercharged air, sufficiently compressed by and discharged from the supercharger 3, flows into the surge tank 6 passing through the inter-cooler 4, and is distributed into the respective cylinders E2 of the engine E through the discrete pipes 6a, respectively. Each cylinder E is supplied with a sufficient amount of supercharged air with an increased charging efficiency, so that the engine provides a higher power output.

Figure 5:
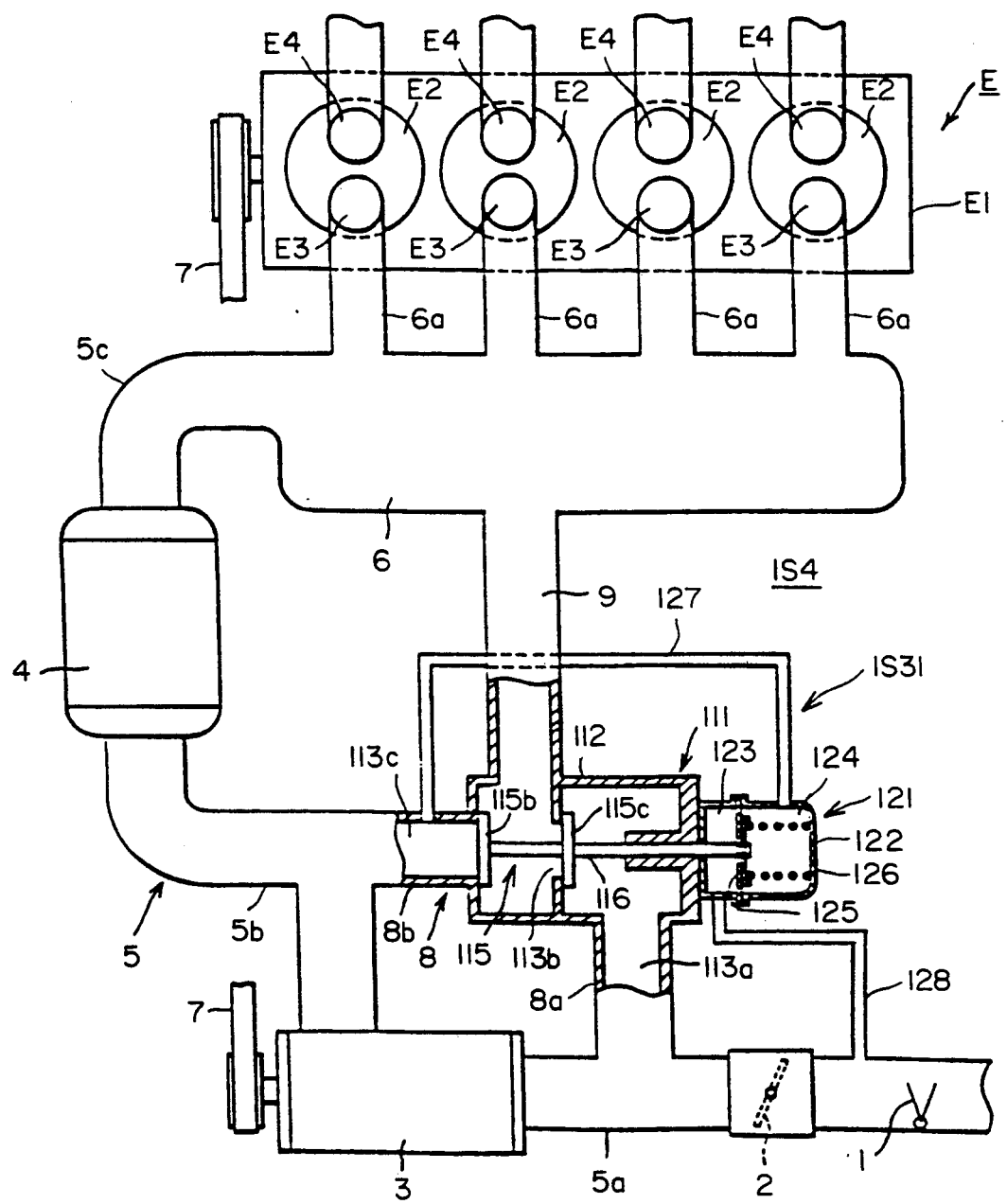
FIG. 5 is a schematic illustration showing an intake system in accordance with a further preferred embodiment of the present invention.

Referring to FIG. 5, shown therein is an intake system in accordance with another preferred embodiment of the present invention. The intake system, generally designated by a reference number IS4 is basically the same as that of FIG. 4, excepting that pneumatic, or pressure operated, valve means SC31 opens and closes, simultaneously, outlet and intermediate ports 113b' and 113c. That is, The difference between the pneumatic valve means SC31 and the pneumatic valve means SC21 of FIG. 3 is that the outlet port 113b' is not provided with a depth.

Accordingly, pneumatic valve means SC31 of the intake system shown in FIG. 5 is controlled, according to engine loads, as follows:

| Engine Load | First Valve Body (115b) | Second Valve Body (115c) |
|---|---|---|
| Lower Loads | Open | Open |
| Middle Loads | Partially Open | Partially Open |
| Higher Loads | Closed | Closed |

In a range of middle engine loads, the first and second valve bodies 115b and 115c of the pneumatic valve means SC31 are maintained open, but partially. Accordingly, the supercharged air discharged from the supercharger 3 returns partly into the intake pipe 5 upstream of the supercharger 3 through the supercharger bypass passage 8 and flows partly into the surge tank 6 through the inter-cooler 4. The supercharged air in the surge tank 6 is mostly distributed into the respective cylinders E through the discrete pipe 6a. A small part of the supercharged air in the surge tank 6 returns into the intake pipe 5 upstream of the supercharger 3 through the inter-cooler bypass pipe 9 and supercharger bypass passage 8.

Figure 6:
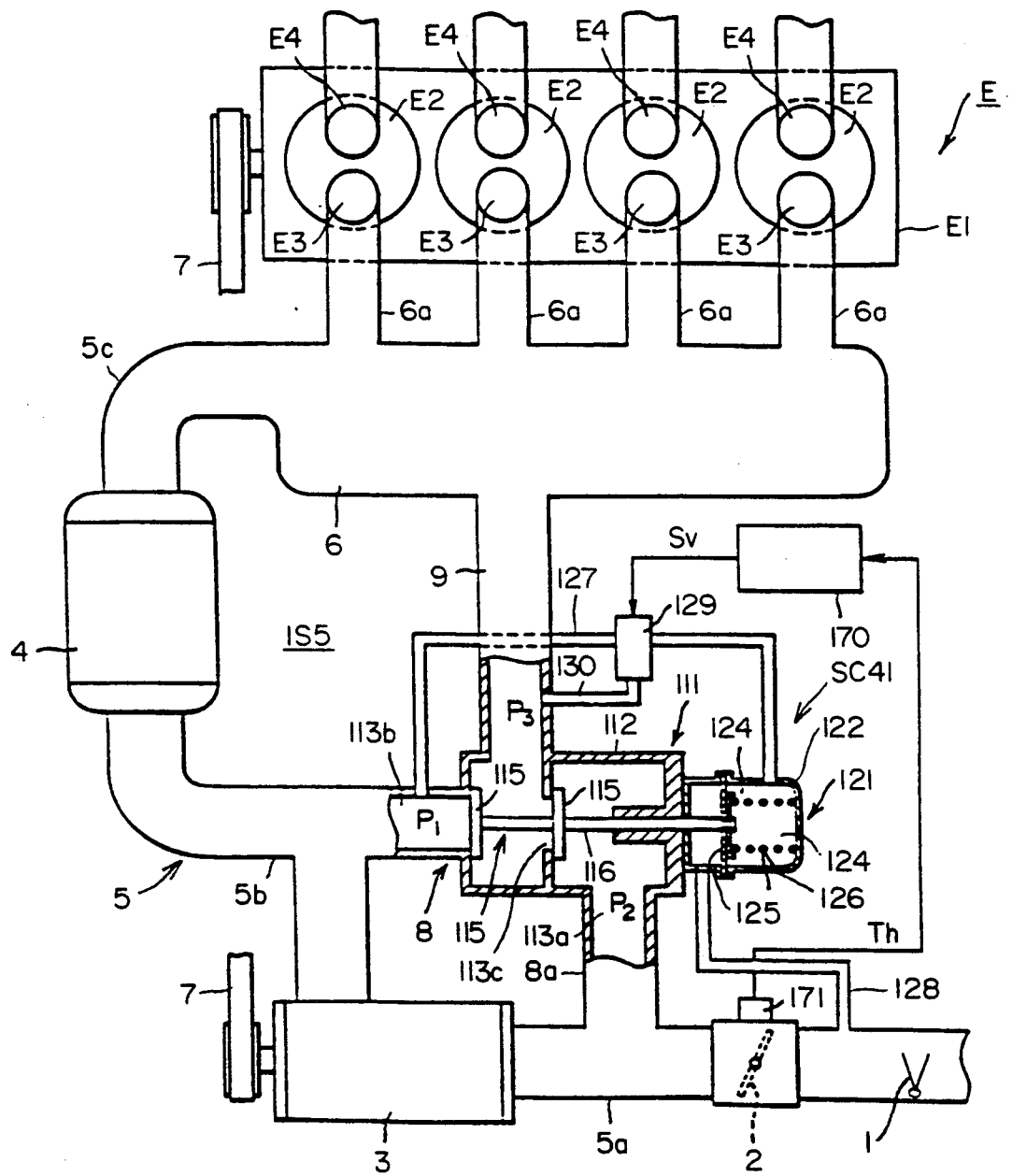
FIG. 6 is a schematic illustration showing an intake system in accordance with a still further preferred embodiment of the present invention.

Referring to FIG. 6, an intake system IS5 having a pneumatic valve means SC41 that is a variant of the pneumatic valve means SC31 of FIG. 4 is shown. The intake system IS5 has a bypass communication pipe 127a by which the inter-cooler bypass pipe 9 is communicated with the communication pipe 127. In this variant, the compression coil spring 126 is stronger than that of FIG. 5. The bypass communication pipe 127a is connected by a three way valve, such as an electrically controlled three way solenoid valve 129 located in the communication pipe 127.

The intake system IS5 includes a control unit 170, basically comprising a general purpose of microcomputer, which receives an electric signal Th representative of an opening, or operated throttle position, of the throttle valve 3 provided from a throttle opening sensor 171, well known in the art. The controller unit 170 outputs, in response to the electric signal Th, a control signal Sv to the solenoid valve 129 in such a way to cause the three way solenoid valve 129 to open the bypass communication pipe 127a so as to introduce the pressure P3 in the inter-cooler bypass pipe 9 into the second pressure charger 124 of the pneumatic valve means SC41 when the throttle valve 2 opens to an opening $\theta 1$ smaller than a predetermined opening near or smaller than the full throttle opening and to open the communication pipe 127 so as to introduce the pressure Pl in the downstream pipe segment of the supercharger bypass pipe 8 into the second pressure chamber 124 of the pneumatic valve means SC41 when the throttle valve 2 opens to an opening larger than the predetermined opening.

Figure 7:
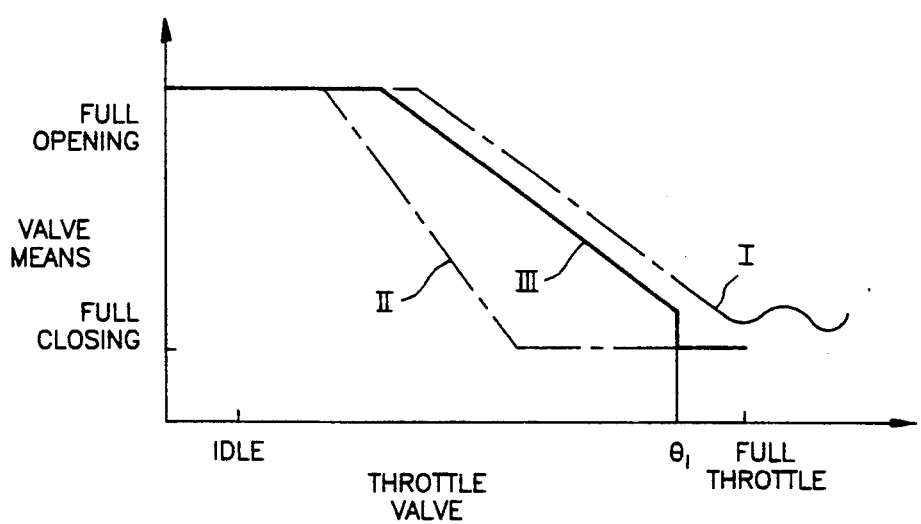
FIG. 7 is a diagram showing opening of pneumatic control valve means.

Because the compression coil spring 126 is stronger, the twin valve body 115, in particular the first valve body 115b, is prevented from oscillating due to pulsations of the pressure P1 in a range of higher engine loads, as is shown by a double-dotted line I in FIG. 7.

As is shown in FIG. 7, a strengthened compression coil spring restricts the twin valve body 115. As shown by a chained line II, the openings of valve body 115 open smaller over a range of middle engine loads as compared with openings of the twin valve body 115 caused by the compression coil spring 126 of the pneumatic actuator 121 of FIG. 5, shown by a solid line III, so as to restrict opening of the outlet port 113b' and cause it to be opened smaller and thereby to cause a decrease in air flow through the supercharger bypass pipe 8 in the middle engine load range. This results in an increase in load to the supercharger 3. However, since the three way solenoid valve 129 opens the bypass communication pipe 127a to introduce the pressure P3 in the inter-cooler bypass pipe 9, lower than the pressure Pl downstream of the supercharger 3 which directly acts on the first valve body 115b, into the second pressure charger 124 of the pneumatic valve means SC41 in the middle engine load range, the twin valve body 115 is forced more in the opening direction by the difference between the pressures Pl and P3. Therefore, although the strengthened compression spring is installed in order to close the twin valve body 115 completely, and shut down the supercharger bypass pipe 8 in the higher engine load range, the twin valve body 115 sufficiently opens it in the middle engine load range so as to prevent the supercharger 3 from being subjected to increased loads in the middle engine load range.

Figure 8:
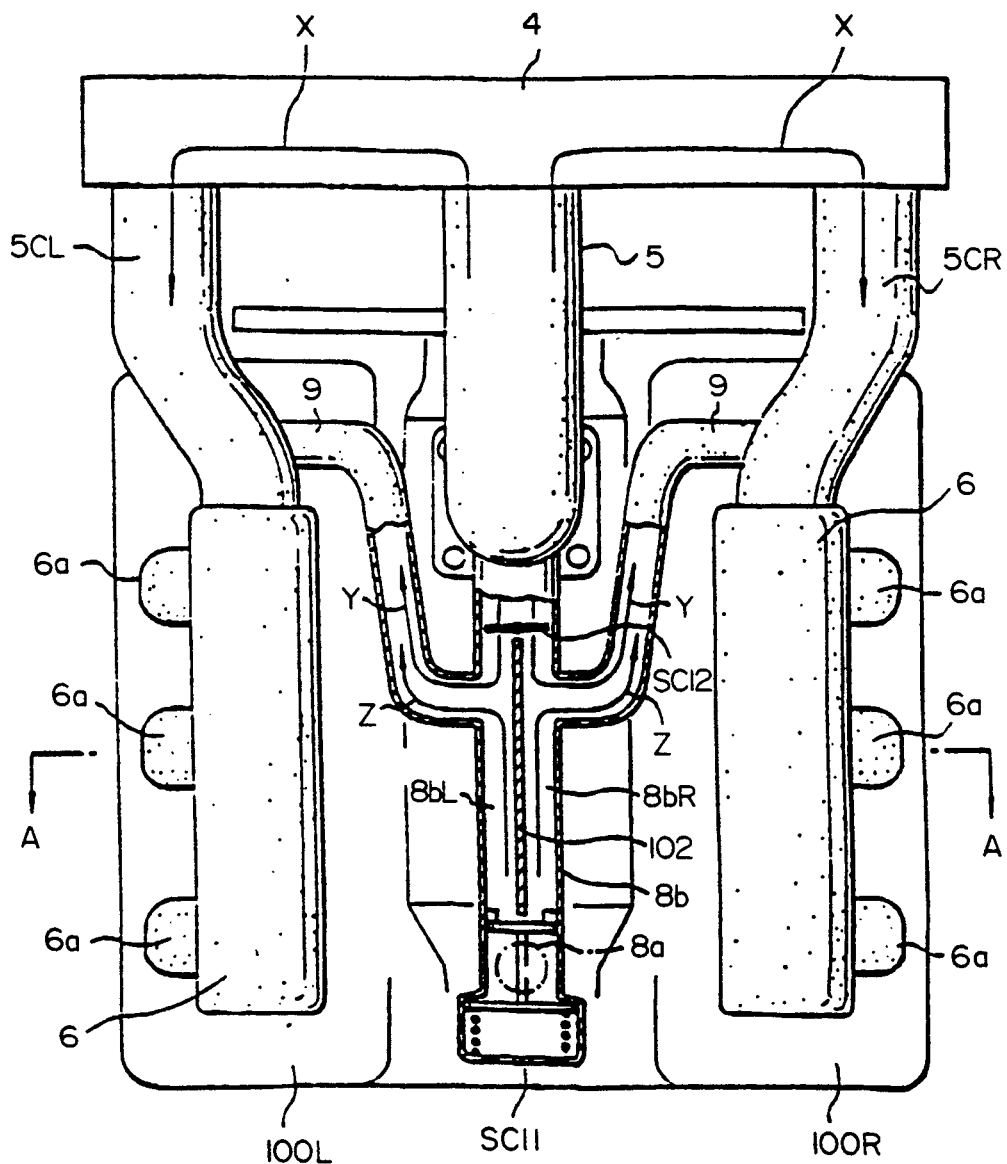
FIG. 8 is a plan view, partly in cross-section, of the intake system of FIG. 2 mounted on a V-type, six cylinder engine.
Figure 9:
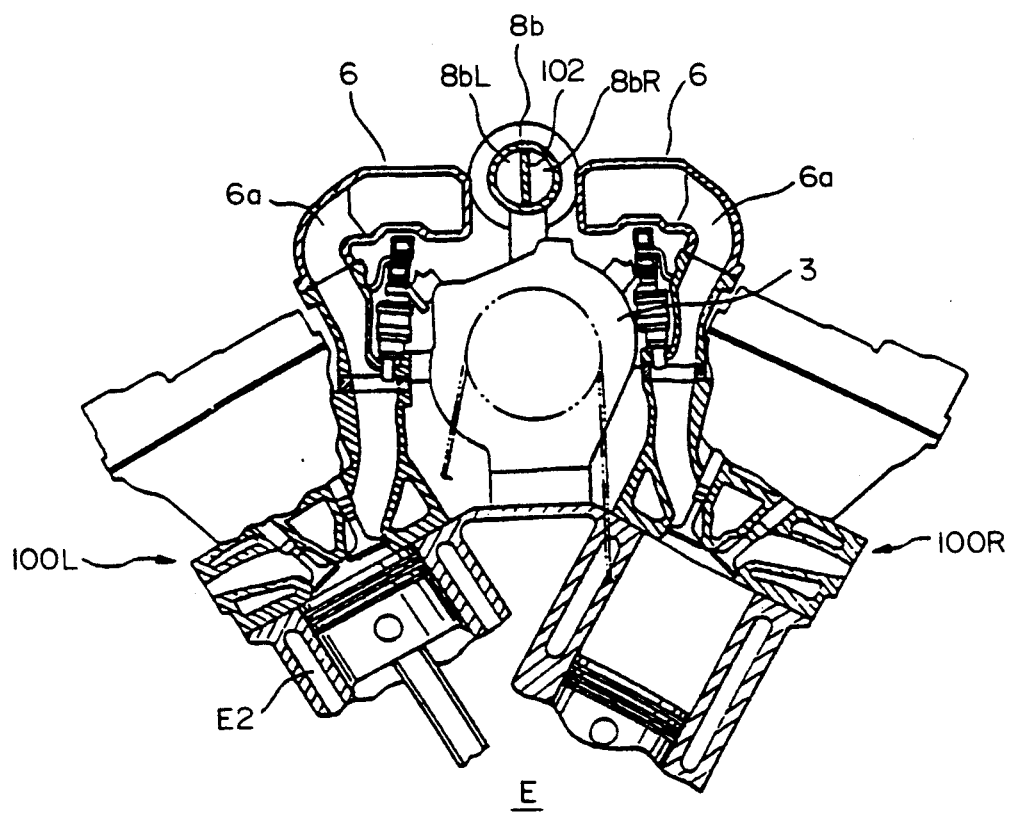
FIG. 9 is a schematic cross-sectional view of FIG. 8 taken along line A—A.
Figure 10:
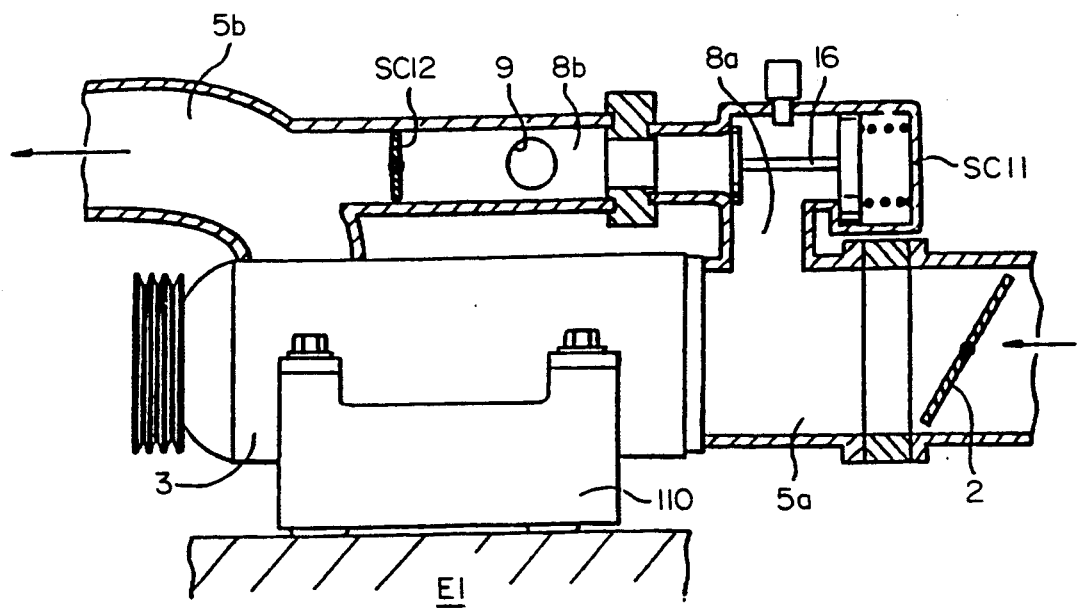
FIG. 10 is a side view, partly in cross-section, of FIG. 2.

FIGS. 8-10 illustrate a practical installation of the intake system of the present invention, for instance the intake system IS2 shown in FIG. 2, on a V-type, six-cylinder internal combustion engine. The engine consists of left and right cylinder banks 100L and 100R arranged in a V-formation arranged at a predetermined relative angle, for example, a relative angle of 60 degrees. The intake system shown in FIG. 2 is mounted on each cylinder bank 100L or 100R. For this purpose, the intake pipe 5 branches into two intake pipe parts 5cL and 5cR between the intercooler 4 and the surge tanks 6.

The downstream pipe segment 8b of the supercharger bypass pipe 8, arranged in the V space between the left and right cylinder banks 100L and 100R, is divided into two longitudinal pipe sections 8bL and 8bR for left and right cylinder banks 100L and 100R, respectively, by a partition wall 102 extending between the first and second pneumatic valve means SCI and SC2 provided therein. The inter-cooler bypass pipe 9 is provided for cylinder bank 100L or 100R and is connected between the downstream pipe segment 8b of the supercharger bypass pipe 8 and the downstream pipe segment 5cL or 5cR of the intake pipe 5 or the surge tank 6.

The supercharger 3 is disposed in the V space between the left and right cylinder banks 100L and 100R and secured to the engine body E1 by a bracket 120. The downstream pipe segment 8b of the supercharger bypass pipe 8 is disposed in the lengthwise direction of the engine body EI above the supercharger 3.

When both the first and second pneumatic valve means SC1 and SC2 are closed, intake air is introduced into the supercharger 3 through the upstream pipe segment 5a of the intake pipe 5 and is discharged from the supercharger 3 into the surge tanks 6 through the inter-cooler 4, as is shown by an arrow X in FIG. 8.

When the first pneumatic valve means SC11 is closed and the second pneumatic valve means SC12 is open, intake air is introduced into the supercharger 3 through the upstream pipe segment 5a of the intake pipe 5 and is discharged from the supercharger into the surge tanks 6 passing through the downstream pipe segment 8b of the supercharger bypass pipe 8 and then inter-cooler bypass pipe 9, as is shown by an arrow Y in FIG. 8.

When the first pneumatic valve means SCII is open and the second pneumatic valve means SC12 is closed, intake air is introduced into the upstream pipe segment 5a of the intake pipe 5 and flows directly into the surge tanks 6 passing through the downstream pipe segment 8b of the supercharger bypass pipe 8 and inter-cooler bypass pipe 9, as is shown by an arrow Z in FIG. 8.

Because of the downstream pipe segment 8b of the supercharger bypass pipe 8 being divided into the longitudinal pipe sections 8bL and 8bR for the left and right cylinder banks 100L and 100R, pressure waves in the inter-cooler bypass passages 9 are prevented from interfering with each other. Accordingly, even though the inter-cooler bypass passages 8bL and 8bR are provided with the downstream pipe segment 8b of the supercharger bypass pipe 8, resonant effects are caused not in the downstream pipe segment 8b of the supercharger bypass pipe 8, but in the intake passage 5 downstream of the inter-cooler 4. It is possible to increase engine output in a range of lower engine speeds by tuning the resonant speed of rotation of the engine that causes the resonance of air in the intake passage 5 downstream of the inter-cooler 4 to a speed in the range of lower engine speeds.

It is to be understood that although the invention has been described in detail with respect to preferred embodiments thereof, various other embodiments and variants are possible which fall within the scope and spirit of the invention, and such embodiments and variants are intended to be covered by the following claims.

What is claimed is:

1. An intake system including an intake passage provided, in order from an upstream side of the intake passage, with a throttle valve, a compressor supercharger and an inter-cooler for delivering supercharged air discharged by the supercharger into cylinders of an internal combustion engine, said intake system comprising:

a supercharger bypass passage branching off from the intake passage upstream of the supercharger and connected to the intake passage downstream of the supercharger for an intake air flow bypassing the supercharger;

an inter-cooler bypass passage branching off from the intake passage upstream of the inter-cooler and connected to the intake passage downstream of the inter-cooler for an intake air flow bypassing the inter-cooler;

valve means for opening and closing said supercharger bypass passage and said inter-cooler bypass passage; and control means for causing said valve means to open both said supercharger bypass passage and said inter-cooler bypass passage when the internal combustion engine operates in a range of lower loads, to open at least said supercharger bypass passage when the internal combustion engine operates in a range of medium loads, and to close both said supercharger bypass passage and said inter-cooler bypass passage when the internal combustion engine operates in a range of higher loads.

2. An intake system as recited in claim wherein said control means causes said valve means to open said supercharger bypass passage and close said inter-cooler bypass passage when the internal combustion engine operates in a range of medium loads.

3. An intake system as recited in claim I, wherein said control means causes said valve means to open partially both said supercharger bypass passage and said inter-cooler bypass passage when the internal combustion engine operates in a range of medium loads.

4. An intake system as recited in claim 1, wherein said valve means comprises first and second pneumatic valve means disposed in said supercharger bypass passage and said inter-cooler bypass passage, respectively.

5. An intake system including an intake passage provided, in order from an upstream side of the intake passage, with a throttle valve, a compressor supercharger and an inter-cooler for delivering supercharged air discharged by the supercharger into cylinders of an internal combustion engine said intake system comprising:

a supercharger bypass passage branching off from the intake passage upstream of the super-charger and connected to the intake passage downstream of the supercharger for an intake air flow bypassing the supercharger;

an inter-cooler bypass passage branching off from the intake passage upstream of the inter.-cooler and connected to the intake passage downstream of the inter-cooler for an intake air flow bypassing the inter-cooler;

a return passage branching off from the intake passage downstream of the inter-cooler and connected to the intake passage upstream of the supercharger for an intake air flow returning into the supercharger;

valve means for opening and closing said supercharger bypass passage, said inter-cooler bypass passage and said return passage; and control means for causing said valve means to open said supercharger bypass passage when the internal combustion engine operates in a range where the internal combustion engine requires no supercharged air and to close said supercharger bypass passage when the internal combustion engine operates in a range where the internal combustion engine requires supercharged air.

6. An intake system as recited in claim 5, wherein said control means causes said valve means to open each of said supercharger bypass passage, said inter-cooler bypass passage and said return passage when the internal combustion engine operates in a range of lower loads, to close said supercharger bypass passage and said inter-cooler bypass passage and open said return passage when the internal combustion engine operates in a range of medium loads, and to close all of said supercharger bypass passage, said inter-cooler bypass passage and said return passage when the internal combustion engine operates in a range of higher loads.

7. An intake system as recited in claim 6, wherein said valve means comprises first, second and third pneumatic valve means disposed in said supercharger bypass passage, said inter-cooler bypass passage and said return passage, respectively.

8. An intake system including an intake passage provided, in order from an upstream side of the intake passage, with a throttle valve, a compressor supercharger and an inter-cooler for delivering supercharged air discharged by the supercharger into cylinders of an internal combustion engine, said intake system comprising:

a supercharger bypass passage branching off from the intake passage upstream of the supercharger and connected to the intake passage downstream of the supercharger for an intake air flow bypassing the supercharger;

first valve means disposed in said supercharger bypass passage for opening and closing said supercharger bypass passage;

an inter-cooler bypass passage branching off from said supercharger bypass passage between said supercharger and said first valve means and connected to the intake passage downstream of the inter-cooler for an intake air flow bypassing the intercooler;

second valve means disposed in said supercharger bypass passage downstream of said first valve means for opening and closing said inter-cooler bypass passage;

control means for causing said first and second valve means to open said supercharger bypass passage and said inter-cooler bypass passage when the internal combustion engine operates in a range of lower loads, to open said supercharger bypass passage and close said inter-cooler bypass passage when the internal combustion engine operates in a range of medium loads, and to close said supercharger bypass passage and said inter-cooler bypass passage when the internal combustion engine operates in a range of higher loads.

9. An intake system as defined in claim 8, wherein said first valve means comprises a pneumatic seal-type valve.

10. An intake system as defined in claim 8, wherein said second valve means comprises a pneumatic butterfly-type valve.

* * * * *